(12) United States Patent
Huo

(10) Patent No.: US 8,408,163 B2
(45) Date of Patent: Apr. 2, 2013

(54) COLLAR USED FOR PET TRAINING

(76) Inventor: William Huo, Shenzhen (CN)

( * ) Notice: Subject to any disclaimer, the term of this patent is extended or adjusted under 35 U.S.C. 154(b) by 100 days.

(21) Appl. No.: 13/057,670

(22) PCT Filed: Oct. 7, 2008

(86) PCT No.: PCT/CN2008/001701
§ 371 (c)(1),
(2), (4) Date: Feb. 4, 2011

(87) PCT Pub. No.: WO2010/040246
PCT Pub. Date: Apr. 15, 2010

(65) Prior Publication Data
US 2011/0132275 A1 Jun. 9, 2011

(51) Int. Cl.
A01K 15/02 (2006.01)
(52) U.S. Cl. ......... 119/718; 119/720
(58) Field of Classification Search .......... 119/712, 119/718, 719, 720, 792, 795, 820, 821, 822, 119/856, 858, 859; 367/139; 340/573.1, 340/573.3; 73/700; 600/301, 458, 500, 490
See application file for complete search history.

(56) References Cited

U.S. PATENT DOCUMENTS

| | | | |
|---|---|---|---|
| 5,046,453 A | 9/1991 | Vinci | |
| 5,864,291 A * | 1/1999 | Walton | 340/573.1 |
| 6,058,889 A * | 5/2000 | Van Curen et al. | 119/721 |
| 6,540,707 B1 * | 4/2003 | Stark et al. | 602/13 |
| 6,668,760 B2 * | 12/2003 | Groh et al. | 119/718 |
| 6,830,013 B2 * | 12/2004 | Williams | 119/765 |
| 7,250,030 B2 * | 7/2007 | Sano et al. | 600/499 |
| 7,992,525 B1 * | 8/2011 | Fisher | 119/860 |
| 2003/0150401 A1 | 8/2003 | Schmid et al. | |
| 2006/0065201 A1 * | 3/2006 | Cogliano et al. | 119/61.56 |
| 2007/0181080 A1 | 8/2007 | Gibson | |
| 2007/0186871 A1 * | 8/2007 | Boyd | 119/859 |
| 2007/0199521 A1 | 8/2007 | Winestock | |
| 2008/0154140 A1 * | 6/2008 | Chang et al. | 600/500 |
| 2008/0234617 A1 * | 9/2008 | Lee et al. | 602/19 |
| 2009/0318818 A1 * | 12/2009 | Whitaker et al. | 600/495 |
| 2011/0125036 A1 * | 5/2011 | Nakajima et al. | 600/500 |

FOREIGN PATENT DOCUMENTS

| | | |
|---|---|---|
| CN | 2647052 | 10/2004 |
| CN | 2914657 | 6/2007 |

OTHER PUBLICATIONS

International Search Report for international patent application No. PCT/CN2008/001701, dated Jul. 16, 2009 (6 pages).

* cited by examiner

Primary Examiner — Rob Swiatek
Assistant Examiner — Lisa Tsang
(74) Attorney, Agent, or Firm — Hamre, Schumann, Mueller & Larson, P.C.

(57) ABSTRACT

A pet training tool includes a pet collar configured to be placed around a neck of a pet, a balloon assembly used for stimulating the neck of the pet during training of the pet, and a movable neck plate. Two ends of the neck plate are movably connected to a lower part of the collar. The balloon assembly, the collar, and the neck plate are disposed together. The balloon assembly controls relative movement of the collar and the neck plate through inflation or deflation to tighten or loosen the collar.

10 Claims, 5 Drawing Sheets

COLLAR USED FOR PET TRAINING

BACKGROUND OF THE INVENTION

1. Field of the Invention

The present invention relates to a pet training tool, and more particularly to a collar in which a balloon is placed at a neck of a pet for stimulation training of the pet.

2. Related Art

Pet training is a part of pet-raising, and many methods for training pets exist. In a commonly used method, a collar is put around a neck of a pet to train the pet. Existing pet training collars mainly include three types: high-voltage electric shock, water spray, and vibration. In the high-voltage electric shock method, two electrodes contacting a neck of a pet are used to train the pet with short-time high-voltage discharge, which is very effective. However, most of the pet owners regard such a method inhumane, and worry that the pet might be hurt. In the water spray method, a high-pressure water container and a valve are installed on a collar, and during use, the valve is turned on to spray water at the neck of the pet for training purposes. The water spray method does not have an effect as good as that of the electric shock method and requires frequent refilling. In the vibration method, a vibrator is installed on the collar so the collar vibrates during use. The vibrating method also does not have a desirable effect.

SUMMARY OF THE INVENTION

The present invention is directed to a pet training collar to solve the above problems, in which a balloon is placed at a neck of a pet, and the collar tightens or loosens by changing an air pressure in the balloon to train the pet, thus incurring no harm to the pet while achieving a desirable training effect.

In order to achieve the above objective, the present invention provides a pet training collar, where the pet training collar includes:

a pet collar, placed around a neck of a pet;

a balloon assembly, used for stimulating the neck of the pet during training of the pet; and a movable neck plate (30).

Two ends of the neck plate are movably connected to a lower part of the collar, the balloon assembly, the collar, and the neck plate are disposed together, and the balloon assembly controls relative movement of the collar and the neck plate through inflation or deflation to tighten or loosen the collar.

The balloon assembly includes a balloon, an air pump, an air exhaust valve, and a controller. The balloon is disposed between the neck plate and the collar. Both the air pump and the air exhaust valve are connected to the balloon, and the controller controls to turn on or off the air pump and the air exhaust valve.

A balloon protective cover is placed around the balloon, and the protective cover is connected to at least one of the neck plate and the collar.

The air pump, the air exhaust valve, and the controller are disposed in a control chamber. The control chamber is a closed shell body, and is connected to the lower part of the collar.

The controller includes an inflation/deflation control device, a receiving device connected to the controller, and a handheld remote control. The inflation/deflation control device is disposed inside the control chamber, and is connected to the air pump and the air exhaust valve. The handheld remote control is held by a trainer, and is wirelessly connected to the receiving device.

The inflation/deflation control device is a single chip microcomputer. The receiving device is at least one of a receiving device that receives a control signal sent by the trainer and a sensor that senses a vibration signal of a pet sound. The receiving device includes an antenna, a high-frequency (HF) receiving and amplifying circuit, and a detection circuit. The receiving device is disposed in a casing. The sensor is a vibration sensor, and is disposed on one side of the neck plate near the neck of the pet.

An additional balloon and an inflation valve are further disposed inside the control chamber for speeding up inflation of the balloon. The inflation valve is connected to the balloon and the inflation/deflation control device of the controller, and the controller controls to turn on or off the balloon and the inflation/deflation control device. The additional balloon is connected to the air pump.

The neck plate is an arc-shaped plate matching the neck of the pet. Two ends of the neck plate are respectively opened with a connecting hole to which the collar is connected through insertion. Rotating shafts for movement of the collar are disposed in the connecting holes.

Contributions of the present invention are as follows. The present invention solves defects of a conventional pet training collar. Since a balloon capable of inflation and deflation is disposed on a collar, during training of a pet, an air pump may be used to inflate or deflate the balloon to tighten or loosen the collar, thus achieving an effect of pulling by human hands, which not only avoids possible injuries to the pet through electric shock, but also prevents the pet from getting uncomfortable, so as to achieve a desirable training effect. In addition, since devices, such as an additional balloon, are disposed to the collar, the inflation of the balloon becomes faster.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention is further described and illustrated through the following embodiments, which are not intended to limit the present invention.

First Embodiment

Figure 1:
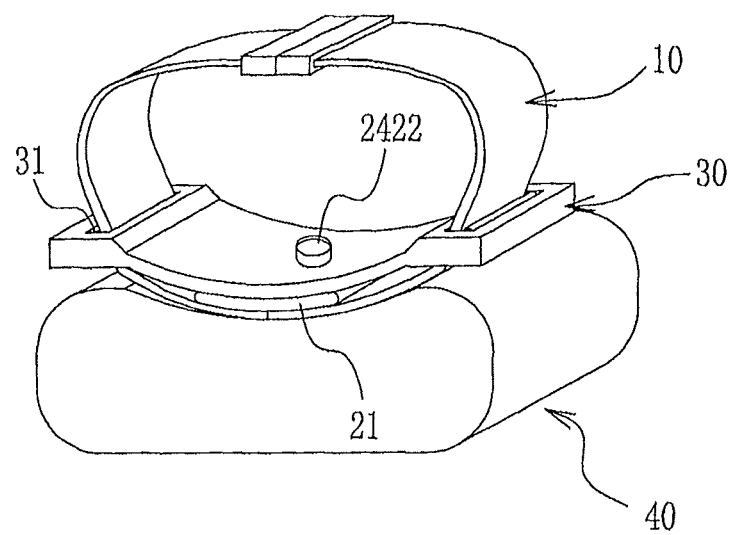
FIG. 1 is a schematic three-dimensional view of an overall structure of the present invention before inflation of a balloon.
Figure 2:
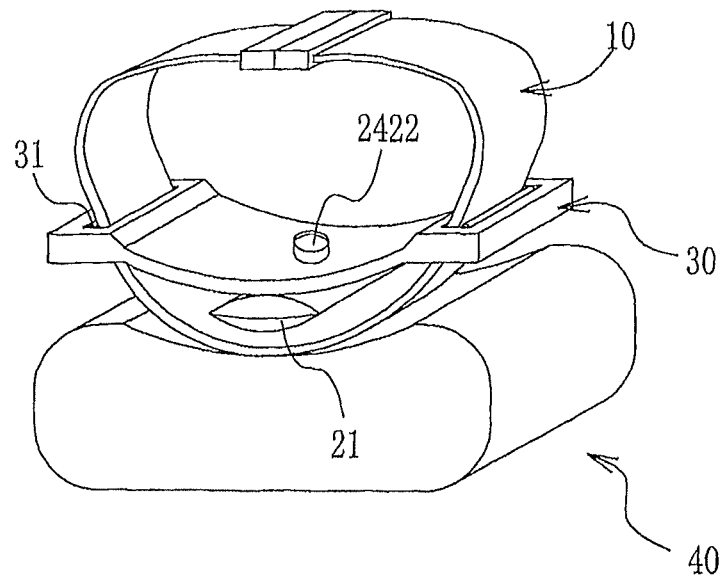
FIG. 2 is a schematic three-dimensional view of an overall structure of the present invention during inflation of a balloon.
Figure 6:
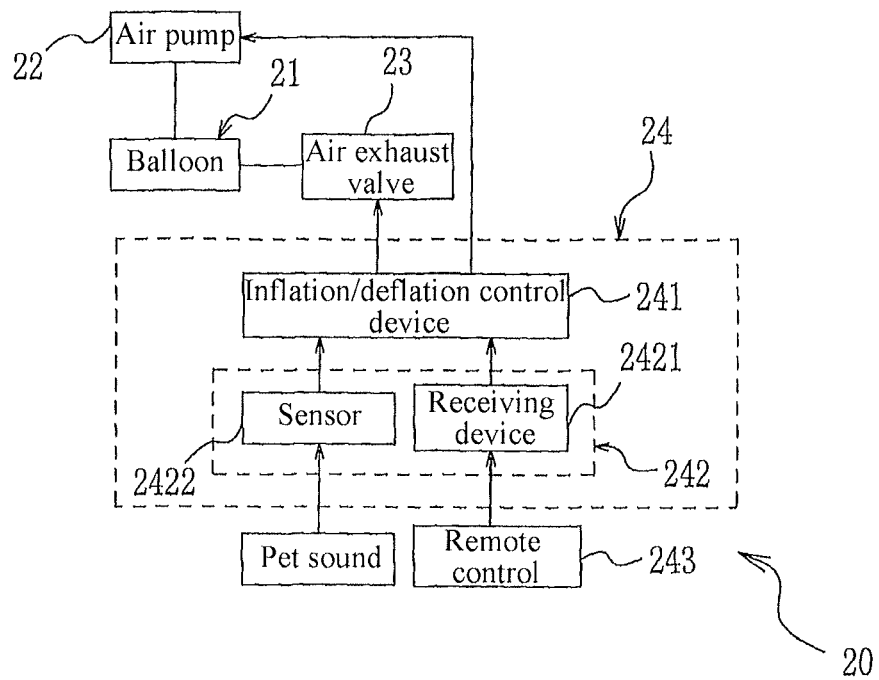
FIG. 6 is a structural block diagram of a balloon assembly according to an embodiment of the present invention.
Figure 8:
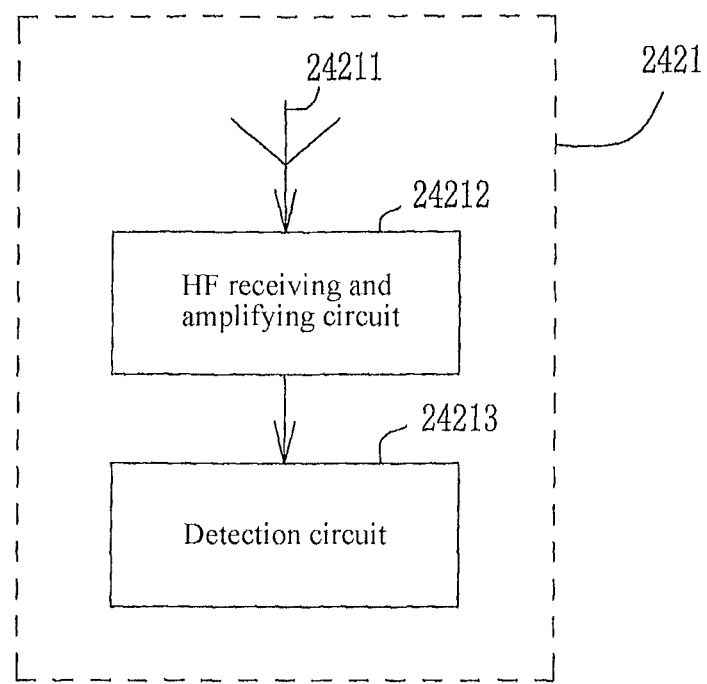
FIG. 8 is a circuit block diagram of a receiving device of a controller.

Referring to FIG. 1, a pet training collar of the present invention includes a pet collar 10, a balloon assembly 20, a neck plate 30, and a control chamber 40. The pet collar 10 is a ring-shaped strip made of a flexible material, and is placed around a neck of a pet during training of the pet. Main characteristics of the present invention are as follows. The collar is disposed with the balloon assembly 20, and a structure of the balloon assembly 20 is as shown in FIG. 6. The balloon assembly includes a balloon 21, an air pump 22, an air exhaust valve 23, and a controller 24. The balloon 21 is made of an elastic material capable of inflation and deflation such as rubber. For ease of connection and protection of the balloon, a balloon protective cover 211 is placed around the balloon 21, and the protective cover 211 may be connected to one or both of the neck plate 30 and the collar 10. The air pump 22 and the air exhaust valve 23 for inflating or deflating the balloon are connected to the balloon 21. The air pump 22 and the air exhaust valve 23 are connected to the controller 24, and the controller 24 controls to turn on or off the air pump 22 and the air exhaust valve 23. As shown in FIG. 6, the controller 24 includes an inflation/deflation control device 241, a receiving device 242 connected to the inflation/deflation control device 241, and a handheld remote control 243. Specifically, the inflation/deflation control device 241 is a single chip microcomputer, and is used for controlling the inflation and deflation of the balloon 21. The receiving device 242 may be a receiving device 2421 that receives a control signal sent by a trainer, or a sensor 2422 that senses a vibration signal of a pet sound. One or both of the receiving device 2421 and the sensor 2422 may be selected for installation according to demands. The receiving device 2421 is a wireless receiving device, and may be a universal wireless receiving device. In this embodiment, as shown in FIG. 8, the receiving device 2421 includes an antenna 24211, an HF receiving and amplifying circuit 24212, and a detection circuit 24213. The receiving device 2421 is disposed in a casing 40, and is wirelessly connected to the handheld remote control 243 held by the trainer. The sensor 2422 is a piezoelectric ceramic sheet vibration sensor, and is disposed at one side of the neck plate 30 near the neck of the pet. The sensor 2422 is a vibration sensor capable of sensing a pet sound. In FIGS. 1 and 2, the sensor 2422 is disposed on the side of the neck plate 30 near the neck of the pet, is connected to the inflation/deflation control device 241, and is capable of sensing a vibration signal of the pet sound and sending the signal to the inflation/deflation control device 241. The handheld remote control 243 (not shown) is a wireless transmission device matching the inflation/deflation control device 241, on which an inflation button and a deflation button are disposed. The remote control is held by the trainer, and is used to send an inflation or deflation command to the inflation/deflation control device 241. A conventional wireless transmission device may be adopted as the remote control.

Figure 3:
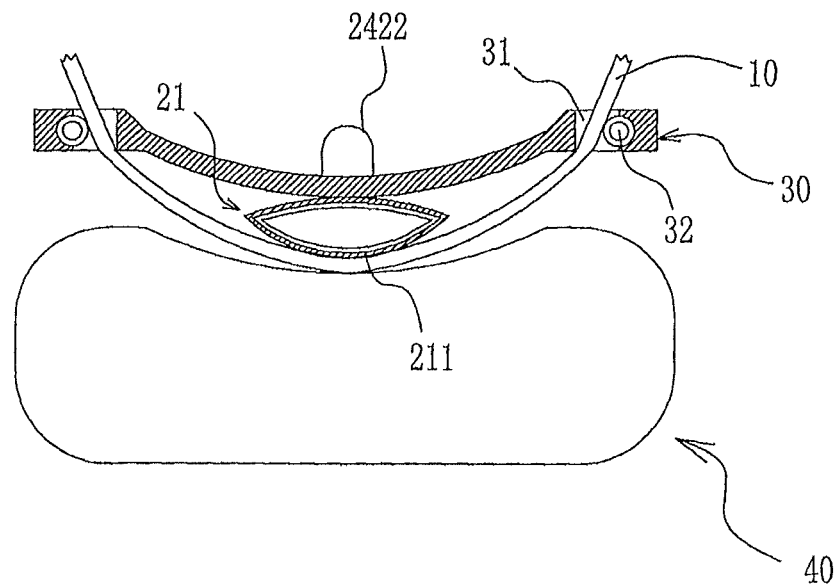
FIG. 3 is a partial sectional view of FIG. 1.
Figure 4:
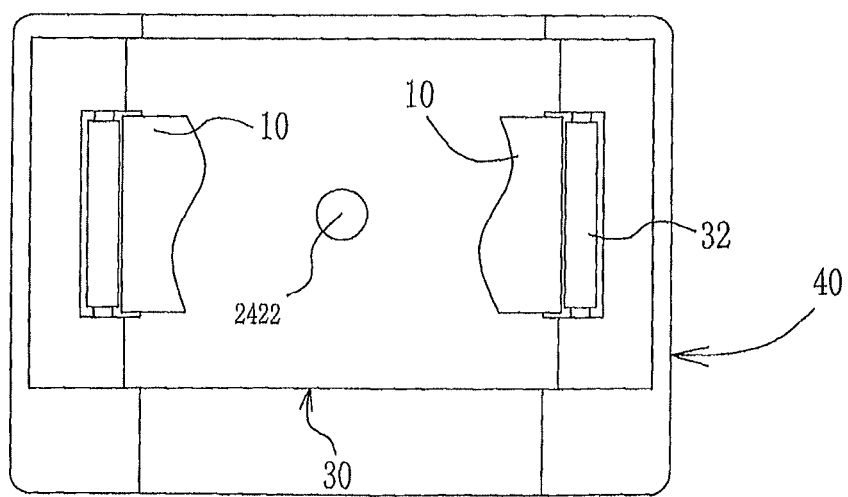
FIG. 4 is a schematic structural top view of FIG. 1.

As shown in FIGS. 1 to 3, the movable neck plate 30 is placed around a lower part of the collar 10. A surface of the neck plate is in a shape of a concave arc, and the curved surface matches the neck of the pet. Two ends of the neck plate 30 are respectively opened with a connecting hole, which is slightly larger than a section of the collar, and to which the collar 10 is connected through insertion. The neck plate 30 is movably disposed on the collar 10 through the connecting holes 31 thereof. Rotating shafts 32 that facilitate movement of the collar 10 are disposed in the connecting hole 31. During inflation or deflation of the balloon 21, the balloon pushes the neck plate 30 to move upward or downward relative to the collar 10, thus achieving an objective of training by tightening or loosening the collar 10 to exert a pressure on the neck of the pet.

Figure 5A:
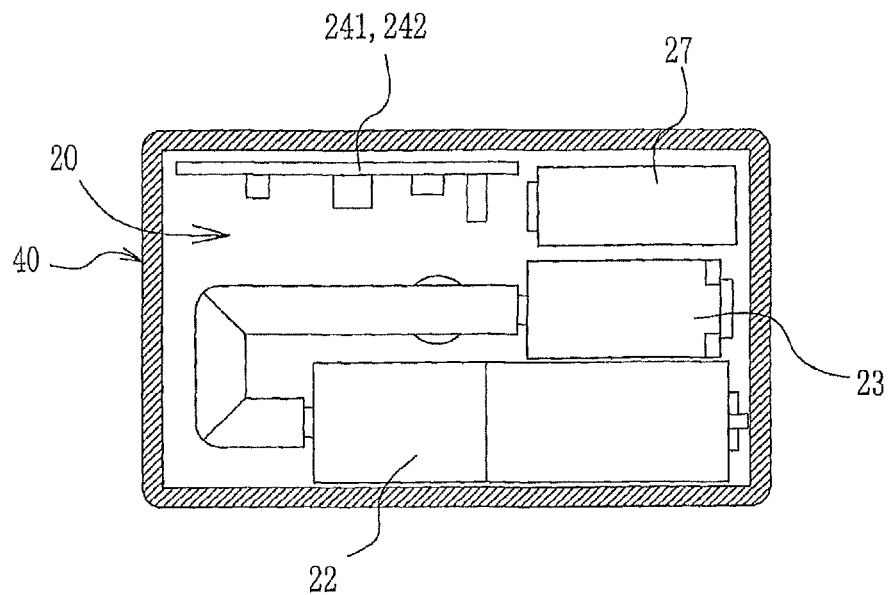
FIG. 5A is a schematic structural view according to a first embodiment.

As shown in FIGS. 1, 2, and 5A, the control chamber 40 is connected at the lower part of the collar 10 through adhesion or rivet connection. The control chamber is a closed shell body. The air pump 22, the air exhaust valve 23, and the controller 24 are disposed inside the control chamber 40. The controller 24 is powered by a battery pack 27 installed in the control chamber 40.

The operation principles of the pet training collar of the present invention are shown in FIG. 6. During training of the pet, the trainer sends an inflation command to the inflation/deflation control device 241 on the collar 10 through the remote control 243. The inflation/deflation control device 241 turns on the air pump 22 to inflate the balloon 21 on the collar 10, and at the moment, the air exhaust valve 23 is turned off. The balloon 21 inflates and pushes the neck plate 30 to move towards the neck of the pet, and pulls the collar 10 in a direction opposite to the direction in which the neck plate 30 moves (the two rotating shafts 32 at the neck plate 30 facilitate the movement), thus tightening the collar 10. The process is similar to pulling by human hands, and the pet is therefore trained. After the balloon 21 reaches a preset air pressure or after inflation for a certain period of time, the inflation/deflation control device 241 controls the air pump 22 to stop inflation, and turns on the air exhaust valve 23 to exhaust the air in the balloon 21 after the pressure is maintained for a preset period of time, so that the balloon 21 deflates, and the collar and the neck plate 30 restore original positions.

Second Embodiment

Figure 5B:
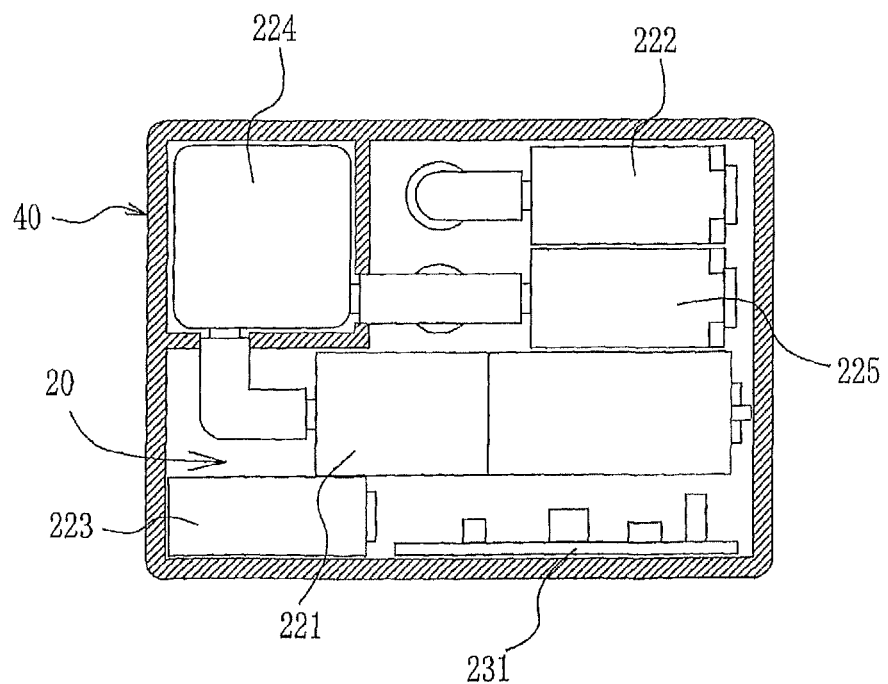
FIG. 5B is a schematic structural view according to a second embodiment.
Figure 7:
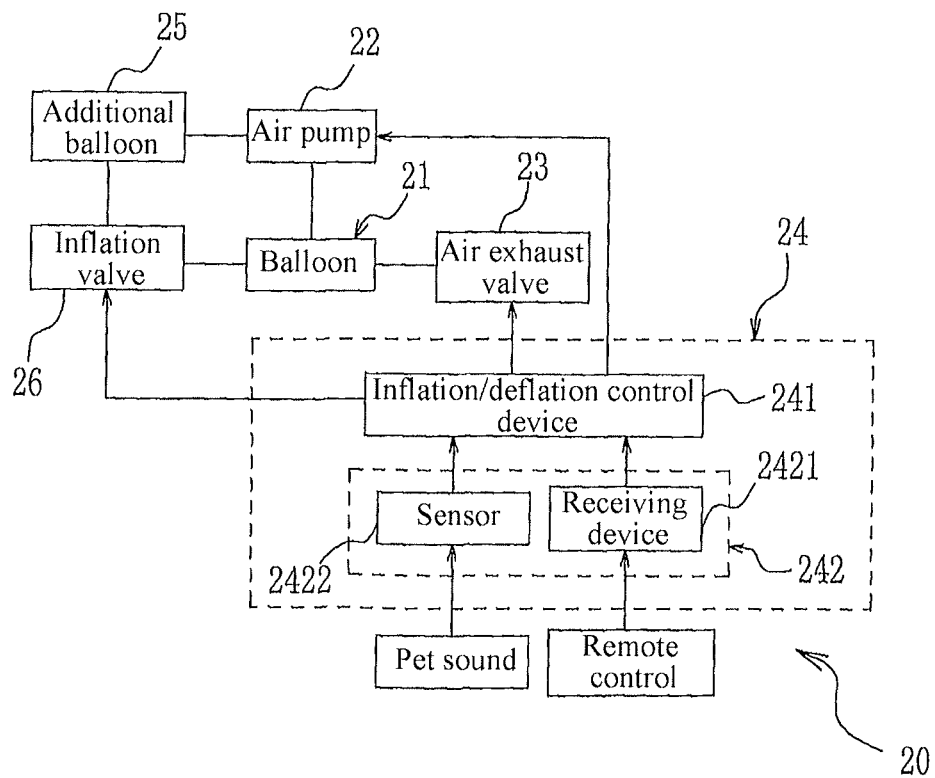
FIG. 7 is a structural block diagram of a balloon assembly according to another embodiment of the present invention.

In this embodiment, the basic structure of the pet training collar is the same as that in first embodiment, and the differences are shown in FIGS. 5B and 7. An additional balloon 25 and an inflation valve 26 are further disposed inside the control chamber 40 for speeding up inflation of the balloon 21. The inflation valve 26 is connected to the balloon 21, the additional balloon 25, and the inflation/deflation control device 241 of the controller, and the controller 24 controls to turn on or off the inflation valve 26. The additional balloon 25 is also connected to the air pump 22.

When the training collar is used for controlling sounds made by pets, the sensor 2422 installed on the neck plate 30 sends the sensed sound of the pet to the inflation/deflation control device 241, and the inflation/deflation control device 241 controls inflation of the balloon 21. The balloon 21 increases pressure as the pet keeps making a sound, so as to stop the pet from making a sound. In other types of training, the balloon 21 is required to reach a preset pressure in a short period of time, and in this case, the additional balloon 25 and the inflation valve 26 may be turned on. When the air pump 22 inflates the additional balloon 25 in advance, the inflation valve 26 is turned off. When the inflation of the balloon 21 needs to be faster, the inflation valve 26 and the air pump 22 are turned on at the same time, and the additional balloon 25 and the air pump 22 inflate the balloon 21 together, thus achieving an effect of fast inflation.

The present invention is thus described through the above embodiments, which are not intended to limit the present invention. All of the above components may be replaced with similar or equivalent ones known by one skilled in the art without departing from the conception of the present invention.

What is claimed is:
1. A pet training tool, comprising:
    a pet collar, configured to be placed around a neck of a pet;
    a balloon assembly, configured to stimulate the neck of the pet during training of the pet; and a movable neck plate having a vibration sensor disposed on the neck plate, the vibration sensor being positioned on a side of the neck plate that is adjacent to the neck of the pet, wherein two ends of the neck plate are movably connected to a portion of the pet collar that is configured to be positioned adjacent an underside of the neck of the pet, the balloon assembly is connected to the pet collar and the neck plate, and the balloon assembly controls relative movement of the pet collar and the neck plate through inflation or deflation to tighten or loosen the pet collar, and the balloon assembly includes a first balloon, an air pump, an air exhaust valve, and a controller, the balloon is disposed between the neck plate and the pet collar, both the air pump and the air exhaust valve are connected to the first balloon, and the controller turns on or off the air pump and the air exhaust valve.

2. The pet training tool according to claim 1, wherein a balloon protective cover is placed around the first balloon, and the protective cover is connected to at least one of the neck plate and the pet collar.

3. The pet training tool according to claim 1, wherein the air pump, the air exhaust valve, and the controller are disposed in a control chamber, the control chamber is a closed shell body, and the control chamber is connected at the portion of the pet collar.

4. The pet training tool according to claim 3, wherein the controller comprises an inflation/deflation control device, a receiving device connected to the controller, and a handheld remote control, the inflation/deflation control device is disposed inside the control chamber, and is connected to the air pump and the air exhaust valve, and the handheld remote control is wirelessly connected to the receiving device.

5. The pet training tool according to claim 4, wherein the inflation/deflation control device is a single chip microcomputer, the receiving device is at least one of a receiving device that receives a control signal sent by the trainer and the vibration sensor that senses a vibration signal of a sound of the pet, the receiving device comprises an antenna, a high-frequency (HF) receiving and amplifying circuit, and a detection circuit, and the receiving device is disposed in a casing.

6. The pet training tool according to claim 4, wherein an additional balloon and an inflation valve for speeding up inflation of the first balloon are further disposed inside the control chamber, the inflation valve is connected to the first balloon and the inflation/deflation control device of the controller, the controller turns on or off the first balloon and the inflation/deflation control device, and the additional balloon is connected to the air pump.

7. The pet training tool according to claim 1, wherein the neck plate is an arc-shaped plate matching the neck of the pet, two ends of the neck plate are respectively opened with a connecting hole to which the pet collar is connected through insertion, and rotating shafts for movement of the pet collar are disposed in the connecting holes.

8. The pet training tool according to claim 1, wherein the first balloon is configured to inflate to push the neck plate to move inward and deflate to pull the neck plate to move outward.

9. The pet training tool according to claim 1, wherein the portion of the pet collar concavely faces the neck plate and forms an inside space to accommodate the first balloon.

10. A pet training tool, comprising:
a pet collar, configured to be placed around a neck of a pet;
a balloon assembly, configured to stimulate the neck of the pet during training of the pet; and
a movable neck plate having a vibration sensor disposed on the neck plate, the vibration sensor being positioned on a side of the neck plate that is adjacent to the neck of the pet, wherein
two ends of the neck plate are movably connected to a portion of the pet collar that is configured to be positioned adjacent an underside of the neck of the pet, the balloon assembly is connected to the pet collar and the neck plate, and the balloon assembly controls relative movement of the pet collar and the neck plate through inflation or deflation to tighten or loosen the pet collar,
the balloon assembly includes a balloon, an air pump, an air exhaust valve, and a controller, the balloon is disposed between the neck plate and the pet collar, both the air pump and the air exhaust valve are connected to the balloon, and the controller turns on or off the air pump and the air exhaust valve,
a balloon protective cover is placed around the balloon, and the protective cover is connected to at least one of the neck plate and the pet collar,
the air pump, the air exhaust valve, and the controller are disposed in a control chamber, the control chamber is a closed shell body, and the control chamber is connected at the portion of the pet collar, and
the controller comprises an inflation/deflation control device, a receiving device connected to the controller, and a handheld remote control, the inflation/deflation control device is disposed inside the control chamber, and is connected to the air pump and the air exhaust valve, and the handheld remote control is wirelessly connected to the receiving device.

* * * * *